Jan. 30, 1951   A. P. HURLEY   2,539,838
BATHROOM CABINET
Filed April 26, 1948
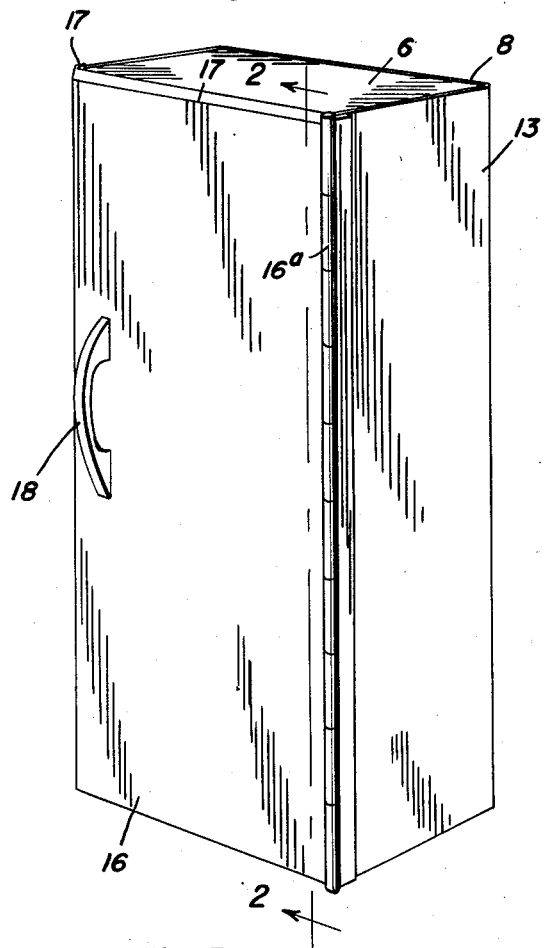
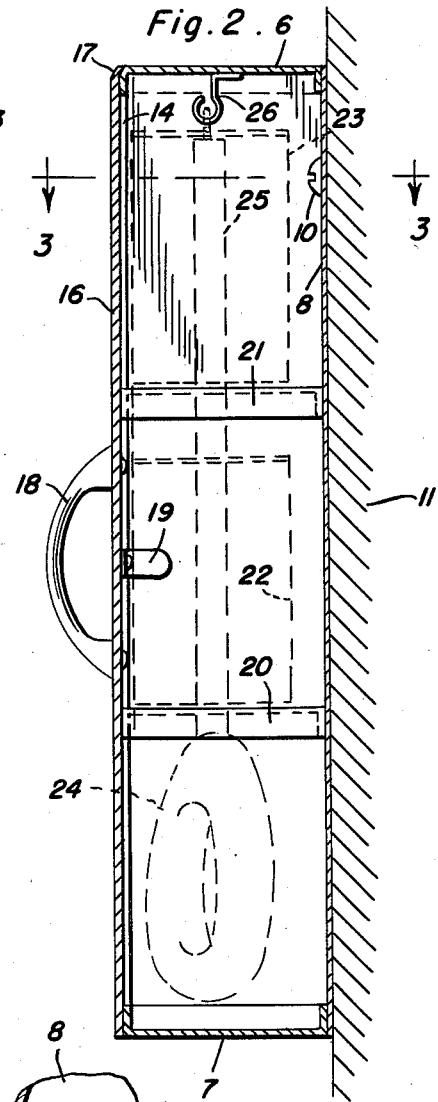
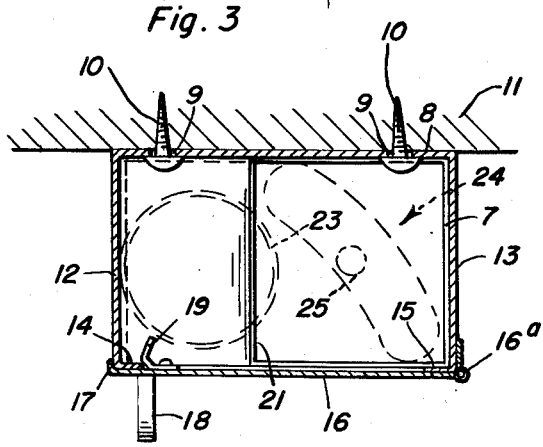
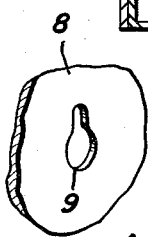
Arthur P. Hurley
INVENTOR.
BY
*Clarence A. O'Brien*
and *Harvey B. Jacobson*
Attorneys Patented Jan. 30, 1951

2,539,838

UNITED STATES PATENT OFFICE 2,539,838

BATHROOM CABINET

Arthur P. Hurley, Boise, Idaho

Application April 26, 1948, Serial No. 23,301

1 Claim. (Cl. 312—206)

The present invention relates to a cabinet which is especially, but not necessarily, adapted for use in so-called bathrooms and toilets, the same being adapted to conveniently enclose a conventional-type toilet bowl brush, a can or equivalent container of scouring or cleansing powders for cleansing the bowl and, also, basin and bathtub, and a can of flushing chemicals or equivalent compound and, perhaps, if desired, a suitable deodorant.

There has been a long-felt need for a simple, practical and economical wall-type cabinet for purposes of handling the aforementioned accessories and facilities for keeping same in a fixed place at the constant disposal of the housewife, whereby to minimize confusion and save steps and time.

Briefly, and more specifically, in carrying out the principles of the invention, I provide a rectangular cabinet with an open front and a hinged closing door for said front, which cabinet may be made from wood, metal, glass or plastic material, may be nicely painted and decorated and which is interiorly provided with two or more short vertically disposed shelves for cans and containers, and an elongated space which may be referred to as a brush hanging and accommodating compartment.

It is an object of the invention to provide a cabinet for the aforementioned purposes which is characterized by top and bottom sections in the form of shallow pans, these being substantially surrounded by the casing proper, and there being smaller pans mounted in one half portion of the casing at vertically spaced points, to provide shelves and, also, to define between themselves and an adjacent wall of the main casing, the aforementioned brush accommodating space.

Other objects and advantages will become more readily apparent from the following description and the accompanying illustrative drawings:

In the drawings:

Figure 1 is a perspective view of a cabinet constructed in accordance with the principles of the present invention, the door being shown closed.

Figure 2 is a vertical section on the line 2—2 of Figure 1, looking in the direction of the arrows.

Figure 3 is a horizontal section on the line 3—3 of Figure 2, looking in the direction of the arrows.

Figure 4 is a fragmentary perspective view of the back wall of the casing.

Referring now to the drawings by distinguishing reference characters, the framework around which I build the casing is primarily made up of top and bottom members, namely, a rectangular pan 6 at the top and a corresponding pan 7 at the bottom. These pans are arranged with their open sides toward each other and are welded within the end portions of the casing. The casing is of sheet material form and the back wall is denoted at 8 and provided with keyhole slots 9 to engage over headed screws or other corresponding fasteners 10 in the wall or other support 11. The vertical side walls are preferably integral with the back wall and are bent around the end portions of the top and bottom pans 6 and 7, and said walls are denoted by the numerals 12 and 13 and are provided with inturned marginal lip portions 14 and 15, defining stops for the closing door 16. The door is a simple rectangular panel and has marginally bent rimming flanges 17 which provide the desired overlapping and close-fitting relation between the door and walls 12. A suitable hinge is provided at 16a. The door is provided with an appropriate handgrip 18 and also with a spring detent or clasp 19 which engages over the lip 14 to hold the door closed. The aforementioned small auxiliary pans are denoted by the numerals 20 and 21 and these are approximately one-third the size of the pans 6 and 7 and are provided with their flanges downturned and are mounted in the left-hand half portion of the casing. They are vertically spaced to provide several compartments, one above the other. The stated compartments may serve to provide spaces for suitable containers. In practice, I have used the lower compartment or space beneath the shelf 20, to accommodate a deodorant. The second compartment above the shelf 20, serves to support a can 22 of scouring powder, and the shelf 21 supports a similar can 23 of flushing compound for toilet bowls and drains. The elongated space, which is a compartment equal to the several compartments just described, serves to accommodate a bowl cleaning brush 24 having a handle 25 with an eye which is adapted to be hung on a suspension hook 26, as shown in full and dotted lines in Figure 2.

I am not unmindful that all sorts of utility cabinets for kitchens, bathrooms, cellars and elsewhere, have been devised for systematic use and for housing articles and devices in the same field of usage. The novelty in the instant case is primarily in the structural details. One phase of novelty is thought to reside in a substantially U-shaped casing, having pan-like enclosures "plugged" into opposite ends and serving as top and bottom portions and as means around which the casing is built and shaped. Additional novelty is predicated upon the introduction of half-pans which are inverted and are fitted into the stated casing between the back and one side wall on one half portion of the casing, and are arranged to provide superposed shelves. These shelves are such that they cooperate, in turn, in defining the elongated space or compartment for housing the brush.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention what is claimed as new is:

A multiple purpose wall-type cabinet construction for use in a bathroom, toilet or the like, comprising a casing, said casing being U-shaped in cross section and embodying a back wall and vertical side walls extending at right angles from said back wall, the free edge portions of the side walls being laterally turned in toward each other and providing flanges, the upper and lower end portions of said flanges terminating short of the corresponding upper and lower end portions of said side walls, an inverted pan having a marginal rim telescopically plugged into the top of said casing and partly resting in end thrust contact against the coacting upper ends of said flanges, a second pan having its marginal rim disposed upright and telescopically plugged into the bottom portion of said casing between the back and side walls and bearing against the adjacent lower ends of said flanges, said casing being open at its front, a hingedly mounted door carried by the casing and normally closing said open front, a pair of duplicate auxiliary pans approximately one-half the area of said top and bottom pans, said auxiliary pans being vertically spaced one above the other and situated equal distances apart, equal distances below and above the top and bottom pans, defining article supporting shelves and simultaneously defining intervening vertically spaced auxiliary article containing compartments, said auxiliary pans having predetermined marginal edge portions secured respectively to the back wall and one of said vertical side walls and spaced from the remaining vertical side wall and, in conjunction with the back wall and latter vertical side wall defining a vertically elongated space, said space providing a main compartment which is unobstructed from top to bottom and adapted to accommodate a toilet-bowl scrubbing brush, said auxiliary compartments also having unobstructed communication with the main compartments.

ARTHUR P. HURLEY.

REFERENCES CITED

The following references are of record in the file of this patent:

UNITED STATES PATENTS

| Number | Name | Date |
|---|---|---|
| 1,336,345 | Cornelius | Apr. 6, 1920 |
| 1,707,013 | Hoegger | Mar. 26, 1929 |
| 1,748,234 | Loeb | Feb. 25, 1930 |
| 1,874,776 | Martin | Aug. 30, 1932 |
| 1,907,679 | Smith | May 9, 1933 |
| 1,991,951 | Matchette | Feb. 19, 1935 |